Patented June 23, 1936

2,045,393

UNITED STATES PATENT OFFICE 2,045,393

DRESSING AND POLISHING AGENTS

Leo Kollek, Ludwigshafen-on-the-Rhine, and Michael Jahrstorfer, Mannheim, Germany, assignors to I. G. Farbenindustrie Aktiengesellschaft, Frankfort-on-the-Main, Germany No Drawing. Application July 18, 1932, Serial No. 623,286. In Germany August 6, 1931

13 Claims. (Cl. 134—24)

The present invention relates to dressing and polishing agents.

We have found that highly valuable preparations for employment as impregnating, dressing, cleaning, polishing and like agents are obtained by incorporating the waxy, polymeric ethers of vinyl alcohol with aliphatic alcohol containing at least 10, preferably at least 12 carbon atoms, with organic solvents therefor and, if desired, with other substances suitable for the superficial treatment of the material desired, as for example with waxy substances, oils, resins, glues, abrasives, coloring materials, emulsifying agents or a plurality of these. The masses thus obtained may be employed with advantage for the said treatment of materials of all kinds, such as wood (floors, furniture), leather, linoleum, textiles or plaited or woven goods, paper, metal articles or artificial masses.

Waxy, polymeric vinyl ethers, suitable for the manufacture of the said preparations, are those of vinyl alcohol with long-chain aliphatic alcohols, especially those corresponding to the saturated or unsaturated fatty acids containing up to say 35 carbon atoms, as for example those corresponding to the acids of fats and waxes of vegetal, i. e. animal and vegetable origin, such as decyl, dodecyl, tetradecyl, cetyl, docosanyl, octodecyl or octodecenyl alcohols or vinyl ethers of "montanol", the mixture of alcohols corresponding to the mixture of acids of Montan wax. In most cases the best results are obtained with polymeric vinyl ethers of alcohols containing from 10 to 20 carbon atoms and especially with those containing from 16 to 18 carbon atoms.

The said polymeric vinyl ethers may be obtained, for example by contacting the corresponding monomeric vinyl ethers singly, or in admixture with each other, preferably at temperatures between about 10 and about 100° C. with practically anhydrous inorganic acid reacting condensing agents, as for example tin tetrachloride, stannous chloride, aluminium chloride or sulphate, iron chloride, zinc chloride, boron fluoride, boron hydrogen fluoride, silicon tetrachloride, mercury chloride, sodium bisulphate, potassium bisulphate, alum, sulphuric acid, phosporic acid, hydrochloric acid or hydrofluoric acid. The quantities of the condensing agents employed are generally between 0.001 and 5 per cent of the weight of the vinyl ether employed, but even very small amounts, as for example from 0.001 to 0.5 per cent, of the weight of the vinyl ether employed, of the condensing agents are sufficient in most cases to effect the polymerization.

The waxy vinyl ethers have in a surprising manner the property of so easily dissolving in the solvents usual in the industries working waxes and also of keeping less readily soluble waxes or waxy substances in solution or fine dispersion in the preparations prepared therewith, that solutions or dispersions of a hitherto unknown high concentration may be obtained.

The said waxy, polymeric vinyl ethers are especially readily soluble in oil of turpentine, and in benzine and benzene. With these solvents it is possible without difficulty to prepare even from 30 to 50 per cent clear solutions which are thinly liquid and do not solidify at room temperature. The waxy polymeric vinyl ethers also dissolve in a large number of other organic solvents of industrial importance, especially in water-insoluble solvents, as for example in hydrocarbons of the benzene series or of mineral oils other than those mentioned above, in butyl acetate, cyclohexanol acetate, cyclohexanone, methylcyclohexanone and in halogenated hydrocarbons, such as methylene chloride and ethylene chloride. They are also readily soluble in various more or less viscous oils, as for example mineral oil fractions and vegetable oils, such as olive oil, sesame oil, linseed oil and China wood oil. The said waxy, polymeric vinyl ethers also have a good compatibility with natural and synthetic waxes and waxy substances; for example they may be mixed in any proportions by fusion with carnauba wax, beeswax, Japan wax, candelilla wax, shellac wax, paraffin wax, ozokerite, ceresine and Montan wax and modified products prepared therefrom, such as may be obtained for example according to the U. S. Patents Nos. 1,834,056 and 1,777,766, and yield therewith entirely homogeneous products. In the same manner they may be added for example to solutions of colophony, colophony glycerine ester resins (ester gum) or artificial resins, prepared for example according to the U. S. Patent No. 1,823,127, in suitable solvents without the often encountered occurrence of turbidity or separation phenomena. The waxy, polymeric vinyl ethers also dissolve the so-called fat-soluble dyestuffs, as for example Sudan orange R (Schultz, Farbstofftabellen, 1931, No. 33), Sudan orange RR (ibid, No. 92), Sudan red BB (ibid., No. 541) as well as fatty colors obtainable for example by fusing 2 parts of stearine with 1 part of Nigrosine base (ibid, No. 985).

Generally speaking, the quantities of organic solvent will be so chosen that from about 5 to about 50, preferably from about 10 to about 40, per cent solutions of the vinyl ethers are obtained, to which solutions a portion of other waxy materials and/or resins may be added; if desired, the quantity of these additional waxy materials may be increased up to, say, 500 per cent by weight of the vinyl ethers but in most cases about 100 or about 200 per cent are sufficient. If aqueous emulsions be desired, the quantity of water may be from about 50 to about 500 per cent of the solutions but is generally chosen between 50 and about 300 per cent.

By reason of the extremely good miscibility of the said waxy, polymeric vinyl ethers with practically all products suitable for the preparation of impregnating, dressing, cleaning, polishing and the like agents, especially those which are insoluble in water but are soluble in water-insoluble solvents, it is possible to prepare preparations of different compositions which are especially adapted to the intended purpose. Liquid wax preparations, which have an excellent action and may be employed especially for mechanical polishing treatment may be prepared advantageously in the said manner. More or less solid waxy preparations may also be obtained, however, by adding the waxy polymeric vinyl ethers to the usual wax preparations prepared in the usual manner, for example from carnauba wax, Japan wax, candelilla wax, Montan wax, paraffin wax, ceresine, ozokerite and like waxy materials or mixtures thereof. The products obtained thereby show a special suppleness and in many cases this renders possible a better and more easy application of the known preparations. The said polymeric vinyl ethers, after fusion, or their solutions may also be worked up into aqueous emulsions which are valuable industrially by the employment of wax soaps or other emulsifying agents, such as sodium salts of alkyl naphthalene sulphonic acids, soaps from thiethanol amine, esters of fatty acids of vegetal origin with alkylol amines or polyethylene glycol ethers of aliphatic alcohols containing from 10 to 20 carbon atoms, as for example the ethers of pentaethylene glycol with octodecyl or octodecenyl alcohols. To these emulsions other additional substances of the nature described above may be added, if so desired.

The following examples will further illustrate the nature of this invention but the invention is not restricted to these examples. The parts are by weight.

*Example 1*

40 parts of polymeric vinyl octodecyl ether are dissolved in 60 parts of a benzine fraction boiling between about 150° and 190° C. The solution is colored with 0.4 part of Sudan orange R. (Schultz, Farbstofftabellen, 1931, No. 33). A thinly liquid, completely clear solution is obtained which is eminently suitable as a polish, for example for linoleum, leather or wood and may be applied thereto by spraying or with the aid of a brush or pad. Application by spraying is recommended, especially if the mechanical final polishing operation is to be carried out with polishing devices, such as electric floor polishing machines, so that troublesome rubbing in of the polish can be avoided and the whole operation is facilitated and accelerated.

*Example 2*

From 5 to 10 parts of polymeric vinyl octodecyl ether are dissolved while heating in 100 parts of a thinly liquid mineral oil distillate having a specific gravity of about 0.899 (low viscosity lubricating oil). After cooling, a clear solution of the waxy substance is obtained which solution is eminently suitable as a dust-laying "oil polish" for the treatment of floors.

*Example 3*

30 parts of polymeric vinyl cetyl ether and 2 parts of mineral oil fraction having a specific gravity of about 0.899 are dissolved in 68 parts of toluene. A thinly liquid clear solution is obtained which may be employed with advantage for impregnating and rendering waterproof wood or like materials and for removing water stains from wax-polished or shellac-varnished surfaces, such as that of furniture.

*Example 4*

10 parts of the polymeric vinyl octodecyl ether specified in Example 1, and 10 parts of paraffin wax are dissolved in 80 parts of benzine. A thin liquid clear solution is obtained which is well suited for the impregnation of fabrics or the like, for sizing and/or waterproofing the same, for example by dipping or painting.

*Example 5*

10 parts of the polymeric vinyl octodecyl ether specified in Example 1, 5 parts of a product obtainable according to Example 4 of the said U. S. Patent No. 1,834,056 and 10 parts of paraffin wax are fused together and 75 parts of oil of turpentine or the same amount of a mineral oil fraction boiling between about 150° and 200° C. are worked into the mixture. A milky solution is obtained which may be employed with advantage for polishing wooden floors or linoleum or for producing a gloss on leather.

*Example 6*

75 parts of a product obtained according to Example 4 of the said U. S. Patent No. 1,834,056 and 75 parts of a waxy, polymeric vinyl ether, obtained from the alcohols corresponding to the acids of Montan wax, are fused together with 20 parts of ozokerite and 130 parts of paraffin wax; 750 parts of a benzine fraction having a boiling range of from 150° to 230° C., are then allowed to flow slowly into the fused mixture while stirring, whereby the temperature of the mass falls from about 105° C. to about 50° C. The floor polish thus obtained is distinguished by special suppleness and stability to temperature.

*Example 7*

2.05 parts of olein are added to 20 parts of a 50 per cent solution of polymeric vinyl octodecyl ether or polymeric vinyl cetyl ether in toluene and then 6.9 parts of a 10 per cent aqueous solution of triethanol amine and 20 parts of water are added.

A milky, thinly liquid emulsion is obtained which may be diluted to a large extent with water without coagulation and formation of a layer of cream on the emulsion. Instead of the 50 per cent solution of the polymeric vinyl ether in toluene, corresponding solutions in benzine, oil of turpentine or a mineral fraction as referred to in Example 1 or 5 may be employed in the same manner.

The emulsions may find useful application as polishing agents for leather, especially lacquered leather, and for coatings from cellulose derivative lacquers on non-resilient bases, such as wood or metal bases, as for example as preparations for polishing and cleansing motor car bodies and like lacquered surfaces.

Example 8

A mixture of 2 parts of the waxy product obtained according to Example 2 of the U. S. Patent No. 1,834,056, 2 parts of the waxy product obtainable according to Example 4 of the said U. S. patent and 3 parts of a waxy product, obtained according to Example 1 of the U. S. Patent No. 1,825,248 without the addition of paraffin, is fused with 1.5 parts of colophony, 3 parts of paraffin wax and 6 parts of polymeric vinyl octodecyl ether the melt being mixed with 15 parts of oil of turpentine and a solution of 1.5 parts of potassium carbonate in 55 parts of water at the boiling point being then added to the mixture. After cooling, a paste is obtained which may be employed as a floor polish.

What we claim is:—

1. Dressing, water-proofing and polishing compositions containing an effective amount of a polymeric vinyl ether of an aliphatic alcohol containing from 10 to about 35 carbon atoms, and an organic solvent selected from the group consisting of liquid hydrocarbons, halogenated hydrocarbons, esters and ketones.

2. Dressing and polishing compositions containing an effective amount of a polymeric vinyl ether of an aliphatic alcohol containing from 10 to 35 carbon atoms, an organic solvent selected from the group consisting of liquid hydrocarbons, halogenated hydrocarbons, esters and ketones and another waxy material.

3. Dressing and polishing compositions containing an effective amount of a polymeric vinyl ether of an aliphatic alcohol containing from 10 to 35 carbon atoms, and a liquid hydrocarbon capable of dissolving said polymeric ether.

4. Dressing and polishing compositions containing an effective amount of a polymeric vinyl ether of an aliphatic alcohol containing from 10 to 35 carbon atoms, and a liquid mineral oil fraction capable of dissolving said polymeric ether.

5. As a dressing, water-proofing and polishing composition from about 10 to about 40 per cent solution of a polymeric vinyl ether of an aliphatic alcohol containing from 10 to about 35 carbon atoms, in an organic solvent selected from the group consisting of liquid hydrocarbons, halogenated hydrocarbons, esters and ketones.

6. As a dressing and polishing composition, from about 10 to about 40 per cent solution of a polymeric vinyl ether of an aliphatic alcohol containing from 10 to about 35 carbon atoms, in a water-insoluble organic solvent selected from the group consisting of liquid hydrocarbons, halogenated hydrocarbons, esters and ketones.

7. As a dressing and polishing composition, from about 10 to about 40 per cent solution of a polymeric vinyl ether of an aliphatic alcohol containing from 16 to 18 carbon atoms, and turpentine oil.

8. As a dressing and polishing composition, from about 10 to about 40 per cent solution of a polymeric vinyl octodecyl ether in a water-insoluble organic solvent such as a liquid hydrocarbon.

9. Water-proofing compositions for leather containing an effective amount of a polymeric vinyl ether of an aliphatic alcohol containing from 10 to about 35 carbon atoms and an organic solvent selected from the group consisting of liquid hydrocarbons, halogenated hydrocarbons, esters, and ketones.

10. The process of water-proofing leather which comprises applying thereto a composition containing an effective amount of a polymeric vinyl ether of an aliphatic alcohol containing from 10 to about 35 carbon atoms and an organic solvent selected from the group consisting of liquid hydrocarbons, halogenated hydrocarbons, esters, and ketones.

11. As a dressing and polishing composition, a composition containing an effective amount of a polymeric vinyl ether of an aliphatic alcohol containing from 10 to about 35 carbon atoms, a resinous substance and an organic solvent selected from the group consisting of liquid hydrocarbons, halogenated hydrocarbons, esters and ketones.

12. As a dressing and polishing composition, a composition containing an effective amount of a polymeric vinyl ether of an aliphatic alcohol containing from 10 to about 35 carbon atoms, a substance selected from the group of natural and synthetic waxes and waxy substances and an organic solvent selected from the group consisting of liquid hydrocarbons, halogenated hydrocarbons, esters and ketones.

13. A dressing and polishing composition comprising an aqueous dispersion of from about 10 to about 40 per cent solution of a polymeric vinyl ether of an aliphatic alcohol containing from 10 to about 35 carbon atoms, in a water-insoluble organic solvent selected from the group consisting of liquid hydrocarbons, halogenated hydrocarbons, esters and ketones.

LEO KOLLEK.
MICHAEL JAHRSTORFER.